(12) United States Patent
Jornod et al.

(10) Patent No.: US 12,342,265 B2
(45) Date of Patent: Jun. 24, 2025

(54) VEHICLE, APPARATUS, METHOD, AND COMPUTER PROGRAM FOR USER EQUIPMENT OF A MOBILE COMMUNICATION SYSTEM

(71) Applicant: VOLKSWAGEN AKTIENGESELLSCHAFT, Wolfsburg (DE)

(72) Inventors: Guillaume Jornod, Berlin (DE); Andreas Pfadler, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 217 days.

(21) Appl. No.: 17/754,717

(22) PCT Filed: Nov. 9, 2020

(86) PCT No.: PCT/EP2020/081537
§ 371 (c)(1),
(2) Date: Apr. 8, 2022

(87) PCT Pub. No.: WO2021/094267
PCT Pub. Date: May 20, 2021

(65) Prior Publication Data
US 2024/0080754 A1    Mar. 7, 2024

(30) Foreign Application Priority Data

Nov. 13, 2019   (EP) .................................. 19208878

(51) Int. Cl.
*H04W 48/16*    (2009.01)
*G08G 1/00*    (2006.01)
(Continued)

(52) U.S. Cl.
CPC .............. *H04W 48/16* (2013.01); *G08G 1/22* (2013.01); *H04W 4/44* (2018.02); *H04W 4/46* (2018.02);
(Continued)

(58) Field of Classification Search
CPC ....... H04W 4/021; H04W 4/022; H04W 4/06; H04W 4/08; H04W 4/40; H04W 4/44;
(Continued)

(56) References Cited

U.S. PATENT DOCUMENTS 10,440,668 B1 * 10/2019 Wu ......................... H04W 4/46
10,863,409 B2    12/2020 Ogawa et al.
(Continued)

FOREIGN PATENT DOCUMENTS

WO    2017142580 A1    8/2017
WO    2017219303 A1    12/2017
(Continued)

OTHER PUBLICATIONS

Jacob et al.; Hybrid V2X Communications: Multi-RAT as Enabler for Connected Autonomous Driving; 2019 IEEE 29th Annual International Symposium on Personal, Indoor, and Mobile Radio Communications (PIMRC); 2019.
(Continued)

*Primary Examiner* — Huy D Vu
*Assistant Examiner* — Scott A Schlack
(74) *Attorney, Agent, or Firm* — BARNES & THORNBURG LLP (57) ABSTRACT

A transportation vehicle, an apparatus, a method, and a computer program for user equipment of a mobile communication system. The method for user equipment (UE) of a mobile communication system and for determining a communication group of multiple UEs includes receiving information on radio access capabilities from candidate UEs of
(Continued)

the communication group, determining one or more radio access technologies to use in the communication group based on the information on the radio access capabilities from the candidate UEs, determining participants of the communication group based on their radio access technologies, and forming the group based on communicating using the one or more radio technologies.

20 Claims, 3 Drawing Sheets

(51) Int. Cl.
    *H04W 4/44*     (2018.01)
    *H04W 4/46*     (2018.01)
    *H04W 8/06*     (2009.01)
    *H04W 8/22*     (2009.01)
    *H04W 8/24*     (2009.01)
    *H04W 28/02*     (2009.01)
    *H04W 76/14*     (2018.01)
    *H04W 88/04*     (2009.01)
    *H04W 88/06*     (2009.01)
    *H04W 92/18*     (2009.01)

(52) U.S. Cl.
    CPC ............... *H04W 8/22* (2013.01); *H04W 8/24* (2013.01); *H04W 28/0215* (2013.01); *H04W 76/14* (2018.02); *H04W 88/04* (2013.01); *H04W 88/06* (2013.01); *H04W 92/18* (2013.01)

(58) Field of Classification Search
    CPC ... H04W 4/46; H04W 36/0022; H04W 36/30; H04W 36/304; H04W 36/32; H04W 36/326; H04W 48/16; H04W 48/18; H04W 76/11; H04W 76/14; H04W 76/15; H04W 76/27; H04W 88/023; H04W 88/04; H04W 88/06; G08G 1/20; G08G 1/22; H04B 7/15507; H04B 7/15528; H04B 7/15592

See application file for complete search history.

(56) References Cited

U.S. PATENT DOCUMENTS

| | | | | |
|---|---|---|---|---|
| 10,966,265 | B2* | 3/2021 | Russell | .................... G08G 1/22 |
| 11,133,857 | B2* | 9/2021 | Pinheiro | ............ H04B 7/15528 |
| 11,218,954 | B2* | 1/2022 | Kim | ...................... H04W 76/11 |
| 2010/0256852 | A1* | 10/2010 | Mudalige | ................. G08G 1/22 |
| | | | | 701/24 |
| 2015/0262481 | A1 | 9/2015 | Selin | |
| 2018/0184270 | A1 | 6/2018 | Chun et al. | |
| 2018/0235022 | A1 | 8/2018 | Wu et al. | |
| 2019/0349730 | A1* | 11/2019 | Kim | ......................... H04W 4/40 |
| 2022/0287083 | A1* | 9/2022 | Gomes Baltar | ... H04W 74/0808 |

FOREIGN PATENT DOCUMENTS

| | | |
|---|---|---|
| WO | 2017183205 A1 | 8/2018 |
| WO | 2018182591 A1 | 10/2018 |
| WO | 2018182592 A1 | 10/2018 |
| WO | 2019027233 A1 | 2/2019 |
| WO | 2019140114 A1 | 7/2019 |

OTHER PUBLICATIONS

Xiao et al.; Power Control for Clustering Car-Following V2X Communication System With Non-Orthogonal Multiple Access; IEEE Special Section on Advances in Signal Processing for Non-Orthogonal Multiple Access; May 22, 2019.

Search Report for European Patent Application No. 19208878.9; Feb. 12, 2020.

Search Report for International Patent Application No. PCT/EP2020/081537; Dec. 15, 2020.

Office Action; European Patent Application No. 19208878.9; May 31, 2023.

Office Action; Japanese Patent Application No. 2022-527734; Jun. 13, 2023.

* cited by examiner

VEHICLE, APPARATUS, METHOD, AND COMPUTER PROGRAM FOR USER EQUIPMENT OF A MOBILE COMMUNICATION SYSTEM

PRIORITY CLAIM

This patent application is a U.S. National Phase of International Patent Application No. PCT/EP2020/081537, filed 9 Nov. 2020, which claims priority to European Patent Application No. 19208878.9, filed 13 Nov. 2019, the disclosures of which are incorporated herein by reference in their entireties.

SUMMARY

Illustrative embodiments relate to a transportation vehicle, an apparatus, a method, and a computer program for user equipment of a mobile communication system, more particularly, but not exclusively, to a concept for determining a communication group of user equipment using multiple radio access technologies (RATs).

BRIEF DESCRIPTION OF THE DRAWINGS

Disclosed embodiments will be described by way of example only, and with reference to the accompanying figures, in which.

DETAILED DESCRIPTION

Direct communication between mobile devices, also referred to as device-to-device (D2D), vehicle-to-vehicle (V2V), or car-to-car communication, has been a feature under development of newer generations of mobile communication systems. By enabling direct communication between devices, network coverage can be extended. Devices located in a coverage area of a mobile communication system may relay signals to devices located out of coverage.

Document WO 2019/027233 A1 relates to a method for performing an operation related to changing of a radio access technology (RAT) by a vehicle-to-everything (V2X) terminal in a wireless communication system. One or more RATs are mapped to each V2X service with respect to a geographical area.

In document US 2015/0262481 A1 a method for determining the occurrence of platoons is disclosed. The method comprises providing several sets of vehicle data in relation to a number of transportation vehicles and comparing the sets of vehicle data for the group of transportation vehicles with at least one limit value for the sets of vehicle data. The method comprises identifying at least a selection of transportation vehicles from the group of transportation vehicles depending on the result of the comparison and calculating the distances between the transportation vehicles in the selection of transportation vehicles. The method comprises determining the relative positions for the transportation vehicles in the selection of transportation vehicles based on at least the calculated distances.

R. Jacob et al describe in "Hybrid V2X Communications: Multi-RAT as Enabler for Connected Autonomous Driving", 2018 IEEE 29th Annual International Symposium on Personal, Indoor, and Mobile Radio Communications (PIMRC), Multi-RAT utilization in automated driving. Exploiting the full potential of automated driving systems requires reliable wireless communication enabling network connectivity and cooperation among transportation vehicles. Multiple V2X technologies are addressing the requirements of connected autonomous driving applications.

Recent investigations have shown that none of the technologies is flexible and reliable enough to serve the diverse requirements in terms of delay, reliability and throughput under the various circumstances observed by transportation vehicles. Hybrid V2X communication enables the coordination of multiple communication technologies to efficiently adapt to the time-varying channel and road traffic conditions. Further it allows to increase reliability and throughput of transmissions by combining multiple RATs in parallel. This work gives an overview of the potential, challenges and main design facets of hybrid V2X communications.

Document WO 2018/182591 A1 relates to a concept for message splitting using multi-radio access technology (multi-RAT) transmission. This concept provides for generating a priority message comprising first data and a non-priority message comprising second data. Further, D1 proposes to select a priority RAT and a non-priority RAT and to transmit the priority message using the priority RAT and the non-priority message using the non-priority RAT.

There is a demand for an improved concept for network access in communication groups.

This demand is addressed by the independent claims attached.

Disclosed embodiments are based on the finding that communication groups among user equipment (UE) can be formed using multiple RATs. In such a communication group radio links between the participants may use different RATs. Which combinations are possible depends on the UE capabilities with respect to communication in different RATs. It is a finding that inter RAT communication groups may be formed if UEs communicate their capabilities with respect to RAT support.

Disclosed embodiments provide a method for user equipment, UE, of a mobile communication system and for determining a communication group of a plurality of UEs. The method comprises receiving information on radio access capabilities from candidate UEs of the communication group and determining one or more radio access technologies to use in the communication group based on the information on the radio access capabilities from the candidate UEs. The method further comprises determining participants of the communication group based on their radio access technologies, and forming the group based on communicating using the one or more radio technologies. Disclosed embodiments enable forming communication groups of UEs using different RATs. In particular, communication groups may be formed based criteria such as spatial closeness or common travelling routes rather than on common RAT.

For example, the method may comprise broadcasting information on radio capabilities of the UE to the candidate UEs. Other UEs may then receive and consider these capabilities when forming communication groups. Disclosed embodiments may enable discovery of UEs using other RATs as group candidates. Using a broadcasting mechanism may enable candidate detection in a proximity of a UE.

Furthermore, the method may further comprise determining a role of the UE in the group based on a predefined set of roles. In exemplary embodiments, the UEs of a communication group may assume different roles or functions, thereby enabling decentralized or centralized group organization over multiple RATs.

In some exemplary embodiments the predefined set of roles comprises relaying messages communicated in the group from a first RAT to a second RAT. In exemplary embodiments, some UEs may assume the role of a relay station between different RATs and UEs, thereby enabling an inter RAT communication group. Disclosed embodiments may assign the role of a relay station to one or more UEs in a communication group, which allows connecting subgroups of different RATs.

The determining of the participants of the communication group may comprise determining a connected graph for the communication group. Edges of the connected graph may indicate communication links between the participants of the communication group using the one or more radio access technologies. Using a graph representation may enable group forming and link evaluation/efficiency improvement.

For example, the method may comprise determining double edges in the connected graph during group communication and modifying the connected graph by reducing a number of double edges in the graph. By reducing the number of double edges redundant communication links may be reduced.

The method may further comprise initially communicating in the group using multiple communication links with different radio access technologies, determining redundant communication links, and refraining from communicating on redundant communication links. Reducing a number of redundant communication links may improve the overall communication efficiency in the communication group.

In some exemplary embodiments the method may comprise broadcasting/receiving information about redundant communication links to/from the communication group participants. By communicating information about redundant links in the group a centralized or decentralized method for reducing or optimizing the number of communication links may be enabled.

The UEs may be transportation vehicles and the communication group may be a platoon of transportation vehicles. Disclosed embodiments may enable efficient inter RAT platooning, thereby enabling larger platoons and corresponding higher traffic efficiency.

The determining of the radio access technology to use between transportation vehicles of the communication group may be based on predicted quality of service for the RAT. Service quality may be improved by being able to select from multiple RATs.

The method may further comprise determining the RAT to use between the transportation vehicles of the communication group based on distances between the transportation vehicles. Disclosed embodiments may enable distance-adaptive RAT selection, which may increase the platooning efficiency.

In further exemplary embodiments the determining of the radio access technology to use between the transportation vehicles of the communication group may be based on an overall fuel consumption of the platoon. Fuel consumption of a platoon may be reduced in illustrative embodiments by making use of different RATs. Fuel efficient RAT selection may be used.

Disclosed embodiments also provide an apparatus for user equipment of a mobile communication system and for determining a communication group of a plurality of UEs. The apparatus comprises one or more interfaces, which are configured to communicate in the mobile communication system. The apparatus further comprises a control module, which is configured to control the one or more interfaces. The control module is further configured to perform one of the methods described herein.

A transportation vehicle comprising the apparatus is another exemplary embodiment.

Disclosed embodiments further provide a computer program having a program code for performing one or more of the above described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be similarly interpreted.

The terminology used herein is for the purpose of describing particular exemplary embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Disclosed embodiments may relate to multi RAT platoon formation as an example of a communication group. One interesting application of cooperated driving is the coordinated longitudinal control of transportation vehicles such as heavy-duty trucks: platooning. Aiming to reduce fuel consumption and to achieve road efficiency whilst guarantying safety, this application is supported by the regular exchange of messages. Here and in the following a platoon of transportation vehicles is considered as an example of a communication group. In general, other communication groups are also conceivable, e.g., UEs grouped for gaming, travelling, information broadcast, etc.

The messages used to support platooning may be standardized messages on specific technologies, or proprietary messages on a wide range of technologies. Modern vehicular systems are equipped with multiple communications systems, called multi radio access technologies (multiRAT) systems. These multiRAT (3rd Generation Partnership Interface PC5, Institute of Electrical and Electronics Engineers, IEEE 802.11p) systems can help to increase the reliability of the message exchange, or to support the combination of different platooning systems, supported by different messages, potentially sent through different technologies.

Some exemplary embodiments may consider information from several transportation vehicles as well as on the relative distances between the candidate transportation vehicles. Disclosed embodiments also consider communication capabilities of the transportation vehicles. Further information may be collected from the transportation vehicles in question directly or via traffic infrastructure (e.g., roadside devices) using wireless communication.

Figure 1:
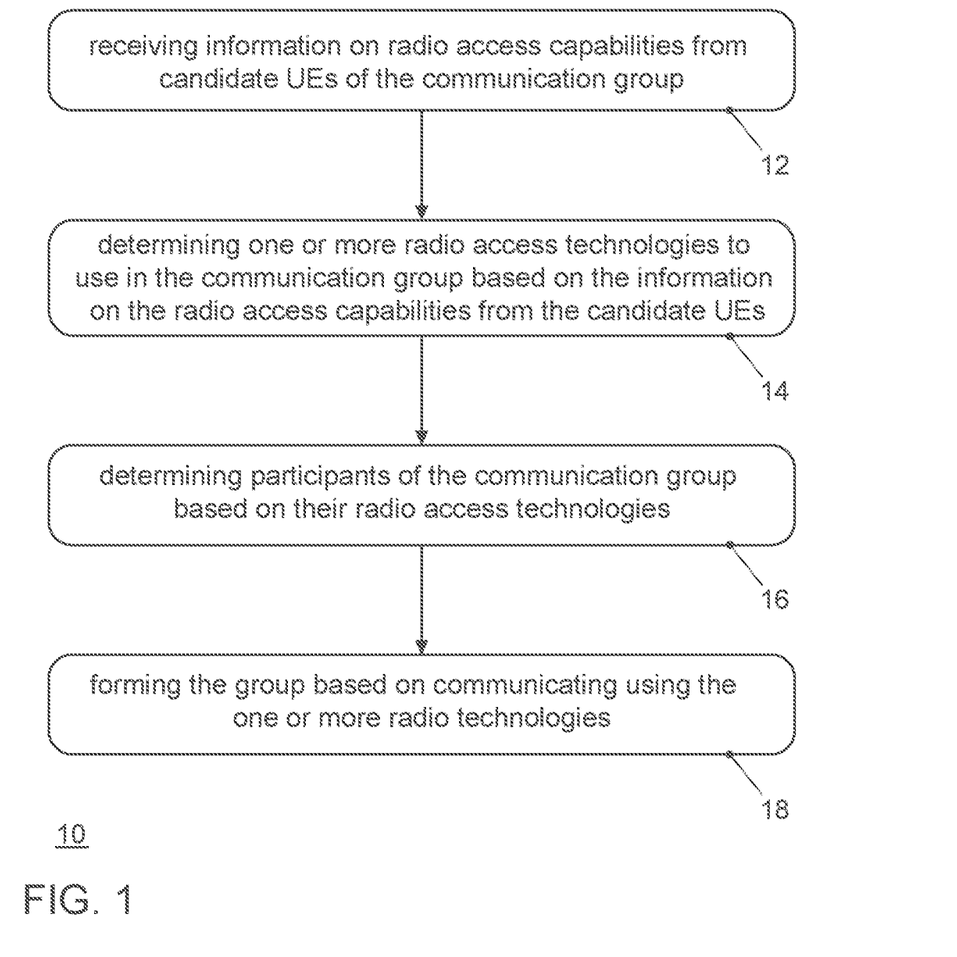
FIG. 1 illustrates a block diagram of an exemplary embodiment of a method for a user equipment (UE)

FIG. 1 illustrates a block diagram of an exemplary embodiment of a method 10 for a UE of a mobile communication system and for determining a communication group of a plurality of UEs. The method 10 comprises receiving 12 information on radio access capabilities from candidate UEs of the communication group, and determining 14 one or more radio access technologies to use in the communication group based on the information on the radio access capabilities from the candidate UEs. The method 10 further comprises determining 16 participants of the communication group based on their radio access technologies, and forming 18 the group based on communicating using the one or more radio technologies. Disclosed embodiments may check communication devices available and the compatibility of these devices. A communication group using multiple or even all available RATs may then be formed, e.g., forming a connected graph as will be detailed below. Other criteria may also be taken into account, e.g., that transportation vehicles need to consume energy to reform the platoon when a communication link is broken. For example, a group of UEs being in a proximity of each other may considered. Depending of their communication capabilities (RAT support) a group of mixed RAT may be formed.

Figure 2:
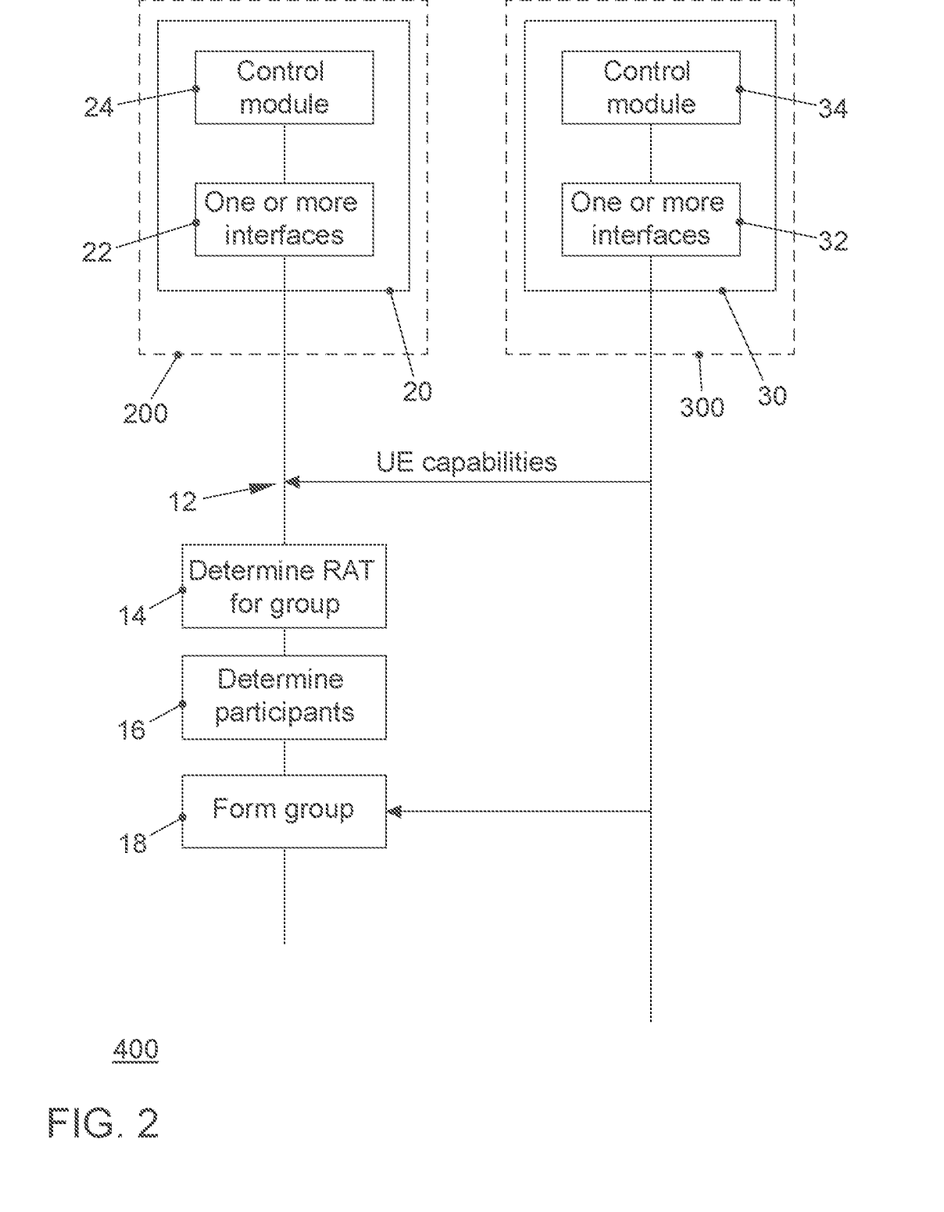
FIG. 2 illustrates block diagrams of exemplary embodiments of an apparatus for a UE, a UE, and a system.

FIG. 2 illustrates block diagrams of exemplary embodiments of an apparatus 20, 30 for a UE 200, 300, a UE 200, 300, and a system 400. In FIG. 2 two exemplary embodiments of apparatuses 20, 30 are shown, which are configured to interact with each other according to the method 10 as described in FIG. 1. In FIG. 2 an apparatus 20, 30 for user equipment 200, 300 of a mobile communication system 400 is configured to determine a communication group of a plurality of UEs. The apparatus 20, 30 comprises one or more interfaces 22, 32, which are configured to communicate in the mobile communication system 400. The apparatus 20, 30 further comprises a control module 24, 34, which is coupled to the respective one or more interfaces 22, 32. The control module 24, 34 is further configured to control the one or more interfaces 22, 32 and to perform one of the methods 10 described herein. The UEs 200, 300 may be transportation vehicles, which comprise exemplary embodiments of the apparatuses 20, 30. Another illustrative embodiment is a system 400 comprising multiple UEs 200, 300 or a method for a system involving multiple UEs 200, 300.

As shown in FIG. 2 the apparatus 20, the control module 24 therein, carries out the method 10, i.e., UE capabilities are received 12 (e.g., from a plurality of candidate UEs), a RAT for a group is determined 14, the group participants are determined 16, and the group is formed 18. These operations may likewise be carried out on the other UE's 300 side. As further indicated in FIG. 2 the other UE 300 may be informed, e.g., by using a according message, about the group forming. For example, candidate UEs may be UEs in a proximity, which broadcast their information, e.g., an identification and RAT capabilities. UEs being in a proximity (communication range) of each other may make them potential group candidates. Such a group may comprise further UEs, e.g., UEs which are not close to each individual UE of the group but close to any UE of the group. This will be detailed further below with the help of a graph consideration.

In exemplary embodiments, the one or more interfaces 22, 32 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22, 32 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22, 32 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 22, 32 may serve the purpose of transmitting or receiving or both, transmitting and receiving, information, such as information related to capabilities, control information, payload information, application requirements, trigger indications, requests, messages, data packets, acknowledgement packets/messages, etc.

As shown in FIG. 2 the one or more interfaces 22, 32 are coupled to the control module 24, 34 at the apparatus 20, 30. In exemplary embodiments the control module 24, 34 may be implemented using one or more processing units, one or more processing devices, any method or mechanism for processing, such as a processor, a computer or a programmable hardware component being operable with accordingly adapted software. In other words, the described functions of the control modules 24, 34 may as well be implemented in software, which is then executed on one or more programmable hardware components. Such hardware components may comprise a general purpose processor, a Digital Signal Processor (DSP), a micro-controller, etc.

FIG. 2 also shows an exemplary embodiment of a system 400 comprising illustrative embodiments of the UEs 200, 300. In exemplary embodiments, communication, i.e., transmission, reception or both, may take place among UEs 200, 300 directly and/or between mobile transceivers/vehicles and a network component (infrastructure or mobile transceiver, e.g., a base station, a network server, a backend server, etc.). Such communication may make use of a mobile communication system 400. Such communication may be carried out directly, e.g., by using device-to-device (D2D) communication, which may also comprise vehicle-to-vehicle (V2V) or car-to-car communication in case of transportation vehicles 200, 300. Such communication may be carried out using the specifications of a mobile communication system 400.

In exemplary embodiments, the one or more interfaces 22, 32 can be configured to wirelessly communicate in the mobile communication system 400. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, in direct cellular vehicle-to-anything (C-V2X), where V2X includes at least V2V, V2-Infrastructure (V2I), etc., transmission according to 3GPP Release 14 onward can be managed by infrastructure (so-called mode 3) or run in a UE (so-called mode 4).

The mobile communication system 400, as shown in the FIG. 2, may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G, or New Radio (NR)) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component such as a base station transceiver, a relay station or a UE, e.g., coordinating service provision in a cluster or group of multiple UEs. A base station transceiver can be operable or configured to communicate with one or more active mobile transceivers/vehicles 200, 300 and a base station transceiver can be located in or adjacent to a coverage area of another base station transceiver, e.g., a macro cell base station transceiver or small cell base station transceiver. Hence, exemplary embodiments may provide a mobile communication system 400 comprising two or more mobile transceivers/vehicles 200, 300 and one or more base station transceivers, wherein the base station transceivers may establish macro cells or small cells, as e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver/vehicle 200, 300 can be associated with a network component, a base station transceiver or a cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. In some exemplary embodiments, a base station transceiver may, for example, operate three or six cells covering sectors of 120° (in case of three cells), 60° (in case of six cells) respectively. A base station transceiver may operate multiple sectorized antennas. In the following, a cell may represent an according base station transceiver generating the cell or, likewise, a base station transceiver may represent a cell the base station transceiver generates.

Figure 3:
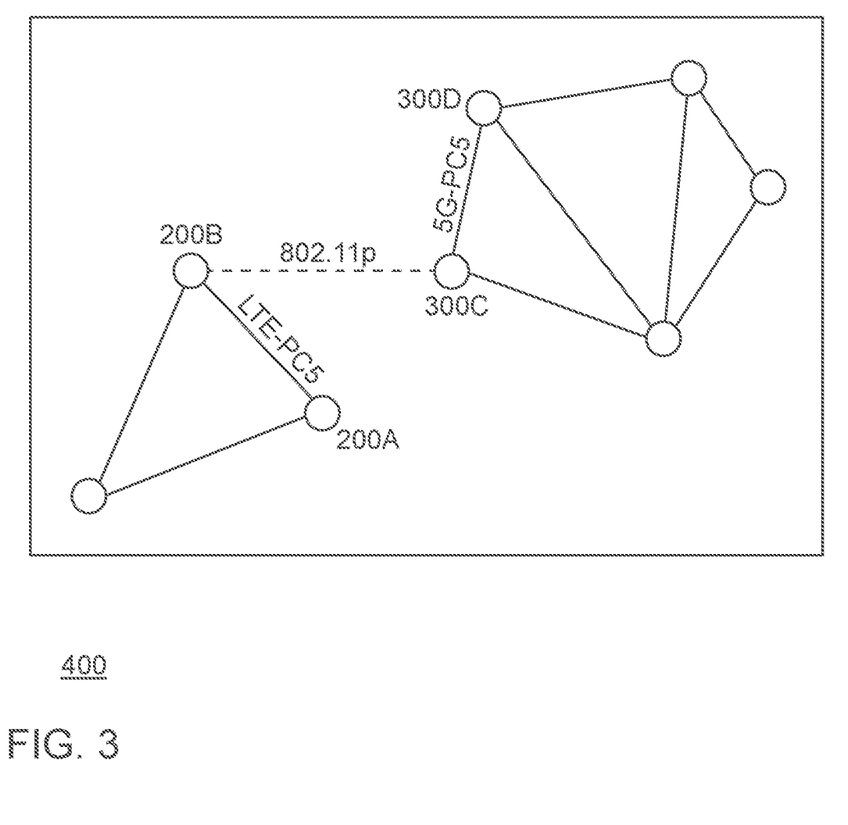
FIG. 3 depicts utilization of a connected graph in an exemploary embodiment.

UEs/Vehicles 200, 300 may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car, DSRC, respectively. Technologies enabling such D2D-communication include 802.11p, 3GPP system (4G, 5G, NR and beyond), etc. For example, the two UEs 100, 200 in FIG. 3 are two transportation vehicles which share a certain section of their route. Accordingly, they would like to exchange certain messages, for example, Cooperative Awareness Messages (CAM) or Decentralized Environment Notification Messages (DENM), etc. For example, certain broadcast signals may be detected such that the transportation vehicles 200, 300 may become aware of each other. At some point, they would like to directly communicate with each other, e.g., to form a cluster or platoon or any other purpose.

As outlined above, in exemplary embodiments information on communication capabilities may be exchanged between UEs/vehicles before forming a group/platoon. For example, such information may be broadcasted by a UE 200 to multiple candidate UEs 300 and vice versa. A coverage region of a UE 200, e.g., the region in which it can receive messages from other UEs 300 and in which the other UEs 300 can receive messages from the UE 200, may determine potential candidates for a communication group. More specifically, these UEs may be candidates (neighbors) for direct communication (one hop, one tier), which may be extended with neighbors of neighbors (two hops, second tier), and so on. This mechanism may be implemented using conventional messages or new messages. In some exemplary embodiments such broadcast may be done before, during and/or after the platoon is formed. Moreover, the method 10 may further comprise determining a role of the UE 200 in the group based on a predefined set of roles. Different roles may be assumed by different UEs 200 in the group. For example, some UEs may be defined as cluster or group heads (e.g., some sort of communication master role) and other may be configured as cluster or group members (e.g., some sort of a communication slave role). Furthermore, the predefined set of roles may comprise relaying messages communicated in the group from a first RAT to a second RAT, vice versa respectively. Some UEs in a group may be capable of using multiple RATs. One or more of these UEs may be configured to relay signals from one RAT to another RAT (and vice versa), thereby allowing UEs that support only a single RAT to be in the same group.

The determining of the participants of the communication group may comprise determining a connected graph for the communication group, wherein edges of the connected graph indicate communication links between the participants of the communication group using the one or more radio access technologies. A connected graph is to be understood as to represent UEs with its nodes and communication links with its edges.

FIG. 3 depicts utilization of a connected graph in an exemplary embodiment. FIG. 3 shows four UEs 200A, 200B, 300C, and 300D, which form a communication group (e.g., transportation vehicles forming a platoon). The radio links are depicted as edges of a connected graph. UEs 200A and 200B communicate via an LTE-PC5 link, UEs 200B and 300C communicate via an 802.11p link, and UEs 300C and 300D communicate via a 5G-PC5 link. As indicated by the dotted 802.11p link, the graph becomes disconnected when the dashed edge is removed (radio link failure on the 802.11p). Before forming a group, it may be verified that the candidate set of transportation vehicles for the platoon is able to form a connected graph (as shown in FIG. 3).

In FIG. 3 the graph is connected. Transportation vehicles 200A and 200B are equipped with LTE-PC5, transportation vehicles 200B and 300C are equipped with 802.11p, and transportation vehicles 300C and 300D are equipped with 5G-PC5. Transportation vehicle 200A is connected to 300D because 200B has both PC5 and 802.11p, and because 300C is equipped with 802.11p and 5G-PC5. In an example of an unconnected graph, transportation vehicles 200A and 200B are equipped with LTE-PC5, transportation vehicles 200B and 300C are equipped with 802.11p, and transportation vehicles 300D is equipped with 5G-PC5. Transportation vehicle 200A cannot communicate with 300D because there is not path to it.

In exemplary embodiments the connected graph might not be visually determined but rather it may be evaluated, which UEs can be included in the group using the available RATs, such that a message can be propagated/relayed to all group members. As illustrated in FIG. 3 the radio link shown in dashed lines is crucial to enable/link all member of the group.

In exemplary embodiments centralized as well as distributed mechanisms are conceivable to form a multi-RAT communication group or platoon. In a centralized mechanism one UE 200, 300 of the group may assume the role of a platoon leader and may collect information from candidate UEs and platoon members to evaluate the graph, assign roles (relay nodes) and organize the platoon. In a distributed approach a platoon and the graph may be formed over time. For example, the method 10 may then further comprise determining double edges in the connected graph during group communication and to modify the connected graph by reducing a number of double edges in the graph. Double edges may be determined by the UEs 200, 300 themselves, e.g., by determining whether they communicate with the communication partners using multiple RATs. For example, the method 10 may comprise initially communicating in the group using multiple communication links with different radio access technologies, determining redundant communication links, and refraining from communicating on redundant communication links. In addition, UEs may broadcast/receive information about redundant communication links to/from the communication group participants. Such information may enable further reduction of redundant communication links and improvement of an efficiency of the group communication. For example, the efficiency may be determined by the number of relaying UEs needed in the group. In both variations, centralized and decentralize, the connected communication graph of the communication graph may be further improved by reducing a number of redundant links, e.g., by improving a position of a relay UE in the graph.

For example, the UEs are transportation vehicles and the communication group is a platoon of transportation vehicles. The method 10 may further comprise determining a radio access technology to use between transportation vehicles of the communication group based on predicted quality of service, pQoS, for the radio access technology. The radio quality of the communication links among the platoon members may be a determining factor of a minimum inter vehicle distance and also for the overall fuel consumption. For example, latencies on the communication links may determine a minimum inter vehicle distance to enable a safe emergency brake maneuver.

In exemplary embodiments the method 10 may comprise determining the radio access technology to use between the transportation vehicles of the communication group based on distances between the transportation vehicles. Such distances may relate to a pQoS for the respective links. In exemplary embodiments the pQoS may be a criterion based on which the graph or communication in the group is improved. It may be more acceptable to have additional radio links in the platoon if the radio link quality is more robust or enhanced. In such a scenario a lower inter vehicle distance may be allowed because of lower latencies for the communication in the group.

In some disclosed embodiments, the method 10 may determine the radio access technology to use between the transportation vehicles of the communication group based on an overall fuel consumption of the platoon. The overall fuel consumption may be based on the minimum inter vehicle distance and its variations due to quality/latency variations of the communication links (the more frequent the variations the more fuel consuming maneuvers are necessary to adapt the intervehicle distance). Disclosed embodiments may apply multiRAT quality of service prediction for a future path of the transportation vehicles. Distance conditions may then be adapted considering the communication ranges of the used communication technologies (RATs). A fuel consumption calculation may be adapted taking into account possible additional fuel consumption due to broken communication links (overload of the channel or out of coverage areas).

As already mentioned, in exemplary embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further exemplary embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS 10 method for first user equipment
12 receiving information on radio access capabilities from candidate UEs of the communication group
14 determining one or more radio access technologies to use in the communication group based on the information on the radio access capabilities from the candidate UEs
16 determining participants of the communication group based on their radio access technologies
18 forming the group based on communicating using the one or more radio technologies.
20 apparatus for user equipment
22 one or more interfaces
24 control module
30 apparatus for user equipment
32 one or more interfaces
34 control module
200 user equipment
200A user equipment 200B user equipment
300 user equipment
300C user equipment
300D user equipment
400 mobile communication system

The invention claimed is:

1. A method performed by user equipment (UE) of a mobile communication system to determine a communication group of a plurality of participant UEs, the method comprising:
receiving information indicating radio access capabilities from candidate UEs of the communication group;
determining one or more radio access technologies to use in the communication group based on the radio access capability information from the candidate UEs;
determining which candidate UEs to be participant UEs in the communication group based on their radio access technology capabilities;
determining UE roles in the communication group based on a predefined set of roles, wherein the predefined set of roles comprises relaying messages communicated in the communication group from a first radio access technology to a second radio access technology;
forming the communication group based on communicating using the one or more radio access technologies, wherein the participant UEs are transportation vehicles, and wherein the communication group is a platoon of transportation vehicles; and
determining a radio access technology to use between the transportation vehicles of the communication group based on the platoon's overall transportation fuel consumption with respect to a quality of service of the radio access technology, wherein:
a quality of service of communication links of the radio access technology determines a minimum inter vehicle distance between transportation vehicles of the platoon and an overall fuel consumption of the platoon,
latencies on communication links of the radio access technology determine the minimum inter vehicle distance to enable a safe emergency brake maneuver, and
the overall fuel consumption of the platoon is affected by the minimum inter vehicle distance and variations of the minimum inter vehicle distance due to communication link latencies because the more frequent the variations of the minimum inter vehicle distance are to compensate for communication link latencies, the more fuel consuming maneuvers are necessary to adapt the minimum inter vehicle distance required for the safe emergency brake maneuver.

2. The method of claim 1, further comprising candidate UEs broadcasting information indicating UE radio capabilities.

3. The method of claim 1, wherein the determination of the participant UEs in the communication group comprises determining a connected graph for the communication group, wherein edges of the connected graph indicate the communication links between the participant UEs in the communication group using the one or more radio access technologies.

4. The method of claim 3, further comprising determining double edges in the connected graph during group communication and modifying the connected graph by reducing a number of double edges in the connected graph.

5. The method of claim 1, further comprising initially communicating in the communication group using multiple communication links with different radio access technologies, determining redundant communication links, and refraining from communicating on redundant communication links.

6. The method of claim 1, further comprising broadcasting/receiving information about redundant communication links to/from the communication group participant UEs.

7. The method of claim 1, further comprising determining a radio access technology to use between transportation vehicles of the communication group based on predicted quality of service for the radio access technology.

8. The method of claim 1, further comprising determining a radio access technology to use between the transportation vehicles of the communication group based on distances between the transportation vehicles.

9. The method of claim 1, wherein the determination of the radio access technology to use between the transportation vehicles of the communication group is also based on distances between the transportation vehicles.

10. An apparatus for user equipment (UE) of a mobile communication system, the apparatus being configured to determine a communication group of a plurality of UEs, the apparatus comprising:
one or more communication interfaces configured to communicate in the mobile communication system; and
a control module configured to:
control the one or more communication interfaces to receive information indicating radio access capabilities from candidate UEs of the communication group;
determine one or more radio access technologies to use in the communication group based on the radio access capability information from the candidate UEs;
determine which candidate UEs to be participant UEs in the communication group based on their radio access technology capabilities;
determine UE roles in the communication group based on a predefined set of roles, wherein the predefined set of roles comprises relaying messages communicated in the communication group from a first radio access technology to a second radio access technology;
form the communication group based on communicating using the one or more radio access technologies, wherein the participant UEs are transportation vehicles, and wherein the communication group is a platoon of transportation vehicles; and
determine a radio access technology to use between the transportation vehicles of the communication group based on the platoon's overall transportation fuel consumption with respect to a quality of service of the radio access technology, wherein:
a quality of service of communication links of the radio access technology determines a minimum inter vehicle distance between transportation vehicles of the platoon and an overall fuel consumption of the platoon,
latencies on communication links of the radio access technology determine the minimum inter vehicle distance to enable a safe emergency brake maneuver, and
the overall fuel consumption of the platoon is affected by the minimum inter vehicle distance and variations of the minimum inter vehicle distance due to communication link latencies because the more frequent the variations of the minimum inter vehicle distance are to compensate for communication link latencies, the more fuel consuming maneuvers are necessary to adapt the minimum inter vehicle distance required for the safe emergency brake maneuver.

11. A transportation vehicle comprising the apparatus of claim 10.

12. A non-transitory computer readable medium including a computer program having a program code for performing the method of claim 1, when the computer program is executed on a computer, a processor, or a programmable hardware component.

13. The apparatus of claim 10, wherein candidate UEs broadcast information indicating UE radio capabilities.

14. The apparatus of claim 10, wherein the determination of the participant UEs in the communication group comprises determining a connected graph for the communication group, wherein edges of the connected graph indicate the communication links between the participant UEs in the communication group using the one or more radio access technologies.

15. The apparatus of claim 14, wherein double edges in the connected graph are determined during group communication and the connected graph is subsequently modified by reducing a number of double edges in the connected graph.

16. The apparatus of claim 10, communication in the communication group is initially performed by using multiple communication links with different radio access technologies, determining redundant communication links, and refraining from communicating on redundant communication links.

17. The apparatus of claim 10, wherein information about redundant communication links is broadcasting/receiving to/from the communication group participant UEs.

18. The apparatus of claim 10, wherein a radio access technology to use between transportation vehicles of the communication group is determined based on predicted quality of service for the radio access technology.

19. The apparatus of claim 11, wherein a radio access technology to use between transportation vehicles of the communication group is determined based on distances between the transportation vehicles.

20. The apparatus of claim 10, wherein a radio access technology to use between transportation vehicles of the communication group is also based on predicted distances between the transportation vehicles.

* * * * *